(12) United States Patent
Strothmann

(10) Patent No.: US 8,604,779 B2
(45) Date of Patent: Dec. 10, 2013

(54) POSITION DETERMINATION OF AN ELECTRIC DRIVE HAVING TWO STATORS AND TWO ROTORS

(76) Inventor: Rolf Strothmann, Saarbruecken (DE)

(*) Notice: Subject to any disclaimer, the term of this patent is extended or adjusted under 35 U.S.C. 154(b) by 214 days.

(21) Appl. No.: 13/138,232

(22) PCT Filed: Dec. 15, 2009

(86) PCT No.: PCT/DE2009/001758
§ 371 (c)(1),
(2), (4) Date: Jul. 21, 2011

(87) PCT Pub. No.: WO2010/085929
PCT Pub. Date: Aug. 5, 2010

(65) Prior Publication Data
US 2011/0273168 A1 Nov. 10, 2011

(30) Foreign Application Priority Data

Jan. 29, 2009 (DE) .................. 10 2009 006 712

(51) Int. Cl.
*G01B 7/30* (2006.01)
(52) U.S. Cl.
USPC ..................................... 324/207.25
(58) Field of Classification Search
USPC ........................................ 324/207.25
See application file for complete search history.

(56) References Cited

U.S. PATENT DOCUMENTS

| 7,256,524 B2 | 8/2007 | Minagawa |
| 2006/0028081 A1 | 2/2006 | Minagawa |
| 2006/0244335 A1 | 11/2006 | Miyazaki et al. |
| 2007/0296281 A1 | 12/2007 | Choi |
| 2009/0278485 A1 | 11/2009 | Strothmann |

FOREIGN PATENT DOCUMENTS

| DE | 100 31 423 | 10/2001 |
| DE | 10 2006 046638 | 6/2007 |
| EP | 1 624 552 | 2/2006 |
| JP | 61-098147 | 5/1986 |
| WO | WO-2007/140576 | 12/2007 |

*Primary Examiner* — Reena Aurora
(74) *Attorney, Agent, or Firm* — Jordan and Hamburg LLP

(57) ABSTRACT

Disclosed is an electric drive, particularly for a pivoting arm, such as a robotic arm, comprising a rotor, a plurality of magnetic periods and a device for determining the rotational position of the rotor based on at least one measurement signal, which is indicative of the inductance of a pole winding strand that is dependent on the position of the pole winding strand relative to the magnetic periods. The electric drive according to the invention that solves this problem in that two coupled rotor parts, which can be jointly rotated at a rotational angle ratio in relation to each other that is fixed, and assemblies comprising magnetic periods and pole winding strands are provided, the assemblies being separate for the rotor parts, wherein the numbers of the magnetic periods for each rotor part are co-prime, and the device for determining the rotational position of the rotor is provided for determining the position from the measurement signals for the two rotor parts.

11 Claims, 2 Drawing Sheets

POSITION DETERMINATION OF AN ELECTRIC DRIVE HAVING TWO STATORS AND TWO ROTORS

BACKGROUND OF THE INVENTION

The invention relates to an electric drive, in particular for a pivoting arm, such as a robotic arm, comprising a rotor, a plurality of magnetic periods, and a device for determining the rotational position of the rotor based on at least one measurement signal, which is indicative of the inductance of a pole winding strand that is dependent on the position of the pole winding strand relative to the magnetic periods.

Such an electric drive is known from DE 100 31 423 A1 and DE 046 638 A1. The rotational position of the rotor of an electric motor is determined based on a voltage signal that is dependent on the phase strand inductance. When the electric motor is operated by way of pulse width modulation, such signals can be captured, for example, at the star point of the phase strands, which are connected in a star configuration. Because the phase strand inductance changes periodically in accordance with the magnetic periods, the rotational position of the rotor can thus only be determined within the respective rotational angle range of a magnetic period. In addition, rotational positions can only be determined indirectly by counting the magnetic periods that have been covered. The counted information must not be lost.

SUMMARY OF THE INVENTION

It is the object of the invention to create a new electric drive of the type mentioned above, which allows the rotational position in a larger rotational angle range to be directly determined than according to the prior art.

The electric drive that solves this problem according to invention is characterized in that two coupled rotor parts, which can be jointly rotated at a rotational angle ratio in relation to each other that is fixed, and assemblies of magnetic periods and pole winding strands are provided, these assemblies being separate for the rotor parts, wherein the numbers of the magnetic periods for each rotor part are co-prime, and the device for determining the rotational position of the rotor is provided for determining the position based on measurement signals for the two rotor parts.

Advantageously, the invention allows the rotational angle of the rotor to be directly determined within a full rotation. Within a full rotation, the two measurement signals have no coinciding value pairs, so that an unambiguous relationship exists between the value pairs of the measurement signal and the rotational angle.

The drive according to the invention is thus particularly suited for objects with limited movement, such as pivoting arms.

While it would be conceivable to divide the electric drive into two completely independent units, in which the rotor shafts are drivingly connected to each other, for example by means of a gear wheel, according to a preferred embodiment of the invention, the rotor parts have a common rotational axis. In particular, the rotor parts are axially rigidly coupled to each other at a rotational angle ratio of 1:1.

In such an embodiment, a common housing can be provided for the rotor parts, with the rotor parts forming an external rotor. Similarly, the separate pole winding assemblies can be attached to a common stator support disposed inside the rotor parts.

The device for determining the rotational position of the rotor preferably comprises measuring devices that capture the measurement signals as voltage signals at the pole winding assemblies.

These measuring devices can notably be provided for capturing the measurement signals at the star point of the phase strands of the pole winding assemblies, which are connected in a star configuration.

The device for determining the rotational position of the rotor advantageously comprises devices that scale the measurement signals, so as to improve the comparability of the measurement signals.

The device for determining the rotational position of the rotor advantageously further comprises a device for comparing the measurement signals to stored table values. Value pairs of the measurement signals, or the quotients of the measurement signals, can be stored in the comparison device in association with rotational angle positions ($\alpha$).

The invention will be described in more detail hereafter based on an exemplary embodiment and the accompanying drawings referencing this exemplary embodiment.

DESCRIPTION OF THE PREFERRED EMBODIMENTS

Figure 1:
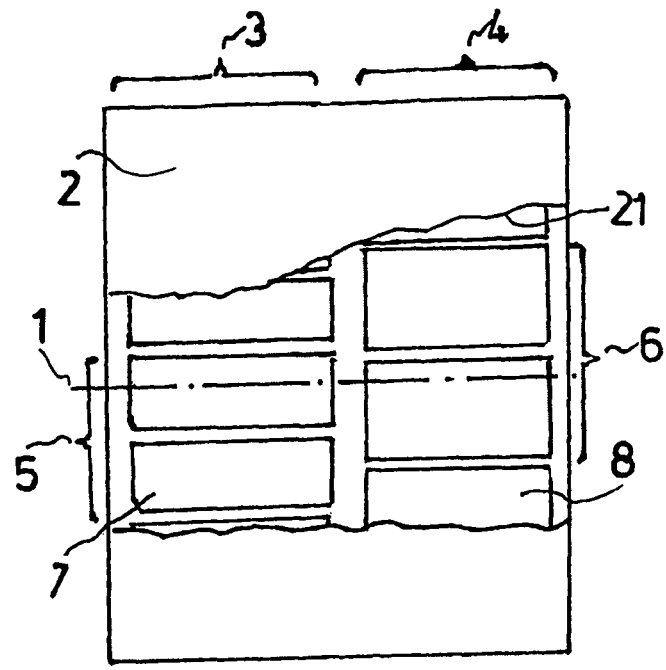
FIG. 1 is an electric drive motor according to the invention.

An electric motor comprises a rotor 2 that can be rotated around an axis 1. The stator is located within the rotor 2 that forms an external rotor, which is not visible in FIG. 1.

In addition to common housing parts and retaining parts, the multipolar electric motor comprises two rotor parts 3 and 4 having separate assemblies comprising different quantities of magnetic periods 5 and 6 in the respective assemblies, the magnetic periods 5 and 6 being formed by permanent magnets 7 and 8 and the permanent magnets being connected to a housing 21 that is common to the rotor parts. There are also different numbers of stator poles in the separate pole winding assemblies that are associated with the rotor parts 3 and 4.

In the embodiment described, each pole winding assembly comprises three phase strands 11 or 12 connected in a star configuration (FIG. 3), each having a plurality of pole windings.

The inductance of the phase strands depends on the field strength of the magnetic field permeating the pole winding cores, and thus it depends on the position of the rotor 2 relative to the phase strands. The inductance I of the individual phase strands changes periodically with the rotational rotor angle $\alpha$, with rotational angle periods of recurring inductance corresponding to the magnetic periods.

Figure 2:
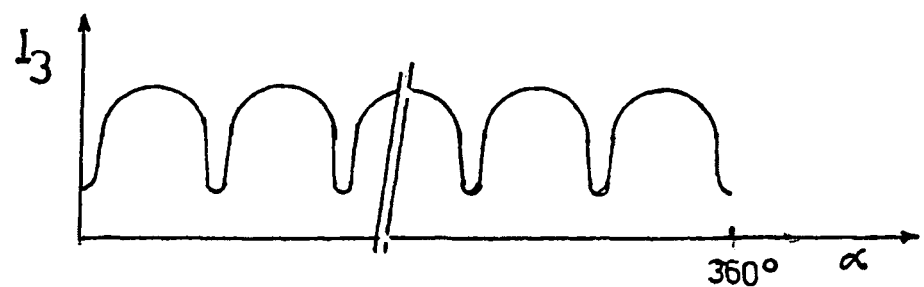
FIG. 2 is an illustration that describes the rotational position dependencies of the phase strand inductances of the motor in FIG. 1.
Figure 2:
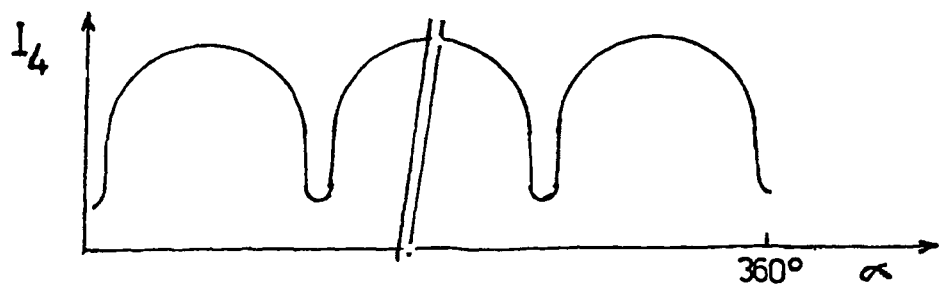

FIG. 2a shows the inductance $I_3$ of a phase strand 11 associated with the rotor part 3, and FIG. 2b shows the inductance $I_4$ of a phase strand 12 associated with the rotor part 4, each as a function of the rotational rotor angle $\alpha$ for a rotation of the rotor 2 through 360°. The different numbers of magnetic periods of the rotor parts 3 and 4 result in different numbers of maxima of the inductances $I_3$ and $I_4$ that recur periodically in a full rotor rotation.

Provided that the numbers of the magnetic periods 5 and 6 of the rotor parts 3 and 4 are co-prime, no recurring value pair $I_3$, $I_4$ is obtained in a full rotation of the rotor 2. Each value pair $I_3$, $I_4$ is unambiguously associated with a rotational angle α.

Figure 3:
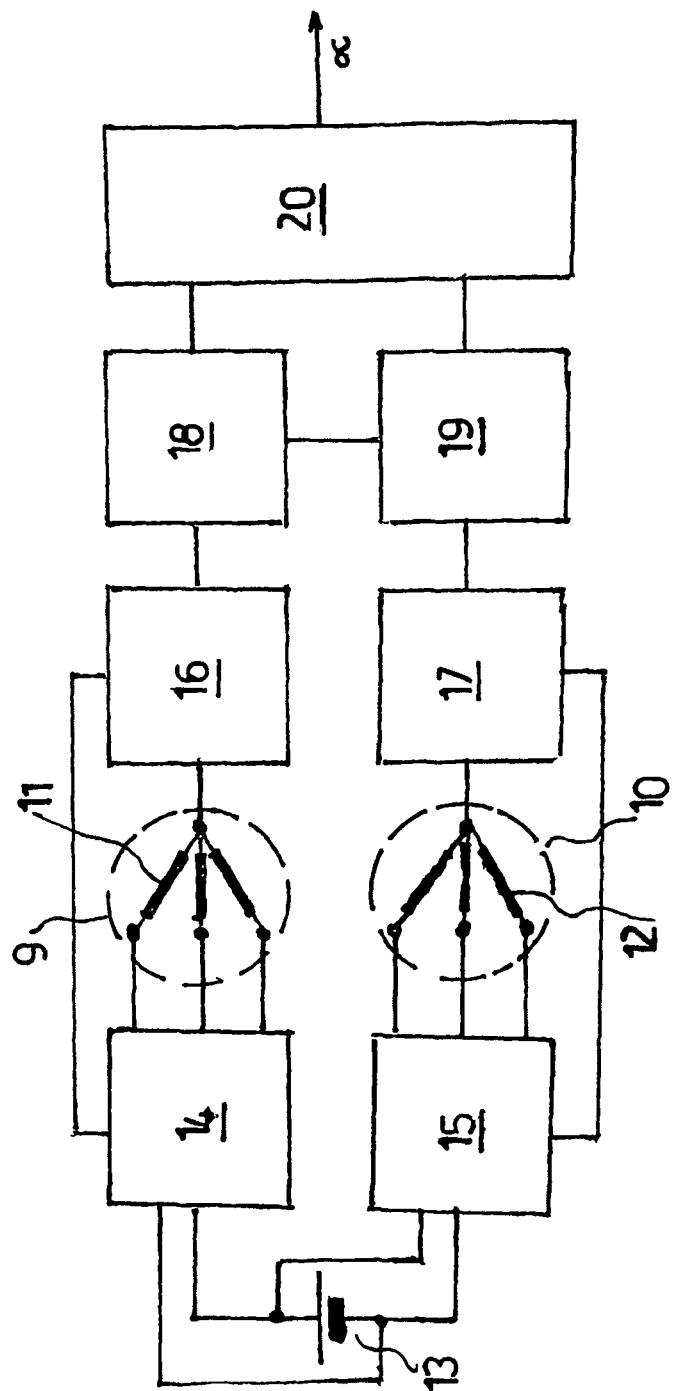
FIG. 3 is a device for operating the drive motor in FIG. 1, comprising a device for determining the rotational rotor position.

The electric motor according to FIG. 1 is operated in the example described here according to the pulse modulation method using the device shown schematically in FIG. 3.

In FIG. 3, dotted lines 9 and 10 indicate the rotor parts 3 and 4, the pole winding assemblies of which associated therewith each comprising three phase strands 11 and 12 which are connected in a star configuration.

The phase strands 11 are connected to a control device 14, and the phase strands 12 are connected to a control device 15. The control devices 14, 15 generate voltage pulses from the direct current of a battery 13 so as to separately operate the sub-units comprising the rotor parts 3 and 4.

A first measuring device 16 captures a voltage signal $S_3$ that is dependent on the inductance $I_3$ at the star point of the phase strands 11, optionally controlled by the control device 14. A second measuring device 17 captures a corresponding voltage signal $S_4$ at the star point of the phase strands 12.

Reference is made to documents DE 100 31 423 A1 and DE 046 638 A1, which are incorporated herein in relation to options for generating and/or capturing voltage signals, notably at the star point.

Scaling devices 18 and 19 connect to the measuring devices 15 and 17, respectively. The scaling devices produce scaled voltage signals $S_3$, $S_4$ from the voltage signals $S_3$, $S_4$ which, for example, are scaled in relation to a mechanical stop position of the rotor.

A comparison device 20 that is connected to the scaling devices 18, 19 contains a reference table in which the value pairs $S_3$, $S_4$ or quotients $S_3/S_4$ are associated with the rotational angle α of the rotor 2 that corresponds to these value pairs or quotients.

The invention claimed is:

1. An electric drive, comprising
    a rotor,
    a plurality of magnetic periods and a device for determining a rotational position of the rotor based on at least one measurement signal, which is indicative of an inductance of a pole winding strand that is dependent on a position of the pole winding strand relative to the magnetic periods,
    two coupled rotor parts, which can be jointly rotated at a rotational angle ratio in relation to each other that is fixed, and
    assemblies comprising said magnetic periods and pole winding strands, the assemblies being separate for the rotor parts,
    wherein numbers of the magnetic periods for each rotor part are co-prime, and
    wherein the device for determining the rotational position of the rotor is provided for determining the position from the measurement signals for the two rotor parts.

2. The drive according to claim 1, wherein the rotor parts have a common rotational axis.

3. The drive according to claim 1, wherein the rotor parts are axially rigidly coupled to each other.

4. A drive according to claim 1, wherein a common housing is provided for the rotor parts.

5. A drive according to claim 1, wherein the device for determining the rotational position of the rotor comprises measuring devices that capture the measurement signals as voltage signals at said assemblies.

6. The drive according to claim 5, wherein the measuring devices for capturing the measurement signals are provided as phase strands of said assemblies that are connected in a star configuration at the star point.

7. A drive according to claim 1, wherein the device for determining the rotational position of the rotor comprises devices that scale the measurement signals.

8. A drive according to claim 1, wherein the device for determining the rotational position of the rotor comprises a device that compares the measurement signals to stored table values.

9. The drive according to claim 8, wherein value pairs or quotients of the measurement signals are stored in the comparison device in association with rotational angle positions.

10. The drive according to claim 1, wherein the drive is used for pivoting a pivotal arm.

11. The drive according to claim 1, wherein the drive is used for pivoting an arm of a robot.

\* \* \* \* \*